United States Patent
Lai et al.

(10) Patent No.: US 7,317,932 B2
(45) Date of Patent: Jan. 8, 2008

(54) PORTABLE PHONE CAPABLE OF BEING SWITCHED INTO HEARING AID FUNCTION

(75) Inventors: Cheng-Shing Lai, Taipei Hsien (TW); Yin-Shan Ji, Nanking (CN)

(73) Assignee: Inventec Appliances Corporation, Taipei Hsien (TW)

( * ) Notice: Subject to any disclaimer, the term of this patent is extended or adjusted under 35 U.S.C. 154(b) by 752 days.

(21) Appl. No.: 10/873,202

(22) Filed: Jun. 23, 2004

(65) Prior Publication Data

US 2005/0288057 A1    Dec. 29, 2005

(51) Int. Cl.
*H04Q 7/32* (2006.01)

(52) U.S. Cl. .............. 455/556.1; 455/556.2; 455/550.1; 455/557; 455/569.1; 455/575.1; 455/575.2; 455/575.6; 379/433.01; 379/441; 381/311; 381/312; 381/315; 381/23.1; 381/300

(58) Field of Classification Search .......... 455/556.1, 455/556.2, 550.1, 557, 566, 569.1, 570, 575.1, 455/575.2, 575.6, 90.3, 73, 74, 422.1, 403, 455/500, 517; 379/433.01, 441; 381/312, 381/315, 23.1, 300, 311
See application file for complete search history.

(56) References Cited

U.S. PATENT DOCUMENTS

| | | | |
|---|---|---|---|
| 5,721,783 A | * | 2/1998 | Anderson .................. 381/328 |
| 6,078,675 A | * | 6/2000 | Bowen-Nielsen et al. .. 381/331 |
| 2002/0076073 A1 | * | 6/2002 | Taenzer et al. ............. 381/315 |

FOREIGN PATENT DOCUMENTS

KR    2002079199    * 4/2001

* cited by examiner

*Primary Examiner*—Keith Ferguson
(74) *Attorney, Agent, or Firm*—Bacon & Thomas, PLLC

(57) ABSTRACT

The present invention discloses a portable phone using a sound receiving unit installed in the portable phone to receive a sound in the surrounding within an appropriate range, and then using a sound source playback device to play a sound after being amplified, so that a person having a hearing problem can just carry a mobile phone to concurrently have the basic functions of the mobile phone and use the sound amplification function of the mobile phone to supplement the deficiency of the hearing ability when talking to or communicating with others. The portable phone can be toggled between the regular telephone function and the hearing aid function, and thus concurrently serving as a hearing aid to the people who have a hearing problem.

10 Claims, 3 Drawing Sheets

PORTABLE PHONE CAPABLE OF BEING SWITCHED INTO HEARING AID FUNCTION

FIELD OF THE INVENTION

The present invention relates to portable phones, more particularly to a portable phone capable of being switched into a hearing aid function by utilizing a sound receiving unit installed in a portable phone to receive a sound in the surrounding within an appropriate range and a sound source playback device to play the amplified sound, so that a person having a hearing problem can just carry a mobile phone to have the basic functions of the mobile phone and also use the sound amplification function of the mobile phone to supplement the deficiency of the hearing ability when talking to or communicating with others.

BACKGROUND OF THE INVENTION

What is sound? Sound is a common term that we often hear, and a sound wave is an air wave produced by a vibrating object that drives the surrounding air of the vibrating object to produce the same vibration. The vibrating object is referred as the sound source. When a sound wave is transmitted to our ears, the hearing system will receive and convert the energy of the sound wave, and then our nervous system will transmit the energy to our cerebrum to sense the hearing after the energy is combined by the cerebrum. And that is the sound we hear.

Yet, how is a sound wave transmitted into our ears? The sound wave enters our outer ear, middle ear, and inner ear one by one, and then enters our brainstem and cerebrum. If there is a problem with any step along the whole process, we probably will lose our hearing. More specifically, the main function of our outer ears and inner ears is to collect and transmit sound waves. As to the cochlea of the inner ear, its main function is to convert the energy of the received sound wave into a nerve signal, and the nerve signal is transmitted from the hearing nerve to the central nervous system. If there is a hearing problem caused by the hindrance at the outer ear or the middle ear, it can be cured by medicines or surgical operations. If the hearing problem is caused by the hindrance at the cochlea of the inner ear or the injury of the hearing nerve, such problem can only be overcome by a hearing aid.

What is a hearing aid? What is its function? A hearing aid is similar to a sound amplifier, and its function is to amplify the volume of a sound, so that a patient having a weak hearing problem who cannot hear any sound can hear sound again.

The so-called "mobile phone" refers to a telephone that uses the outdoor mobile communication terminal equipment to communicate with another mobile phone user through a wireless network system or communicate with a regular telephone user via the indoor telephone network. The development of mobile phones is very fast, and almost everyone has a mobile phone in these days. Therefore, unless one has completely lost one's hearing ability, a person having a weak hearing problem still can use a mobile phone to talk directly with others by wearing a hearing aid. Even though such person has not worn a hearing aid, that person still can communicate with others in a text form by adopting the short message service (SMS) function of the mobile phone.

Since mobile phones are very common and popular in our daily life, therefore if a person having a hearing problem can use a mobile phone with sound amplification function as a hearing aid to achieve the all-in-one function. Such invention is definitely a great contribution to the people who have a hearing problem.

SUMMARY OF THE INVENTION

In view of the profound analysis and description of the foregoing prior art, the inventor of the present invention conducted extensive researches and experiments and finally developed and designed a portable phone that can be switched to the hearing aid function in the hope of contributing to the people who have a hearing problem.

The primary objective of the present invention is to benefit the people having a hearing problem, such that a person having a hearing problem can use a mobile phone as a hearing aid which includes a sound amplification function. The main technology is to use a sound receiving unit installed in a portable phone (such as a mobile phone) to receive a sound in the surrounding within an appropriate range, and then a sound source playback device (such as an earphone) to play the amplified sound, so that a person having a hearing problem can just carry a mobile phone to have the basic functions of the mobile phone (such as having a phone call or sending and receiving a short message) and also use the sound amplification function of the mobile phone to supplement the deficiency of the hearing ability when talking to or communicating with others.

With the foregoing ingenious idea, a portable phone can be switched to the hearing aid function, and thus serving as a hearing aid to the people who have a hearing problem.

To make it easier for our examiner to understand the objective of the invention, its shape, structure, innovative features, and performance, we use a preferred embodiment together with the attached drawings for the detailed description of the invention.

DETAILED DESCRIPTION OF THE PREFERRED EMBODIMENTS

Figure 1:
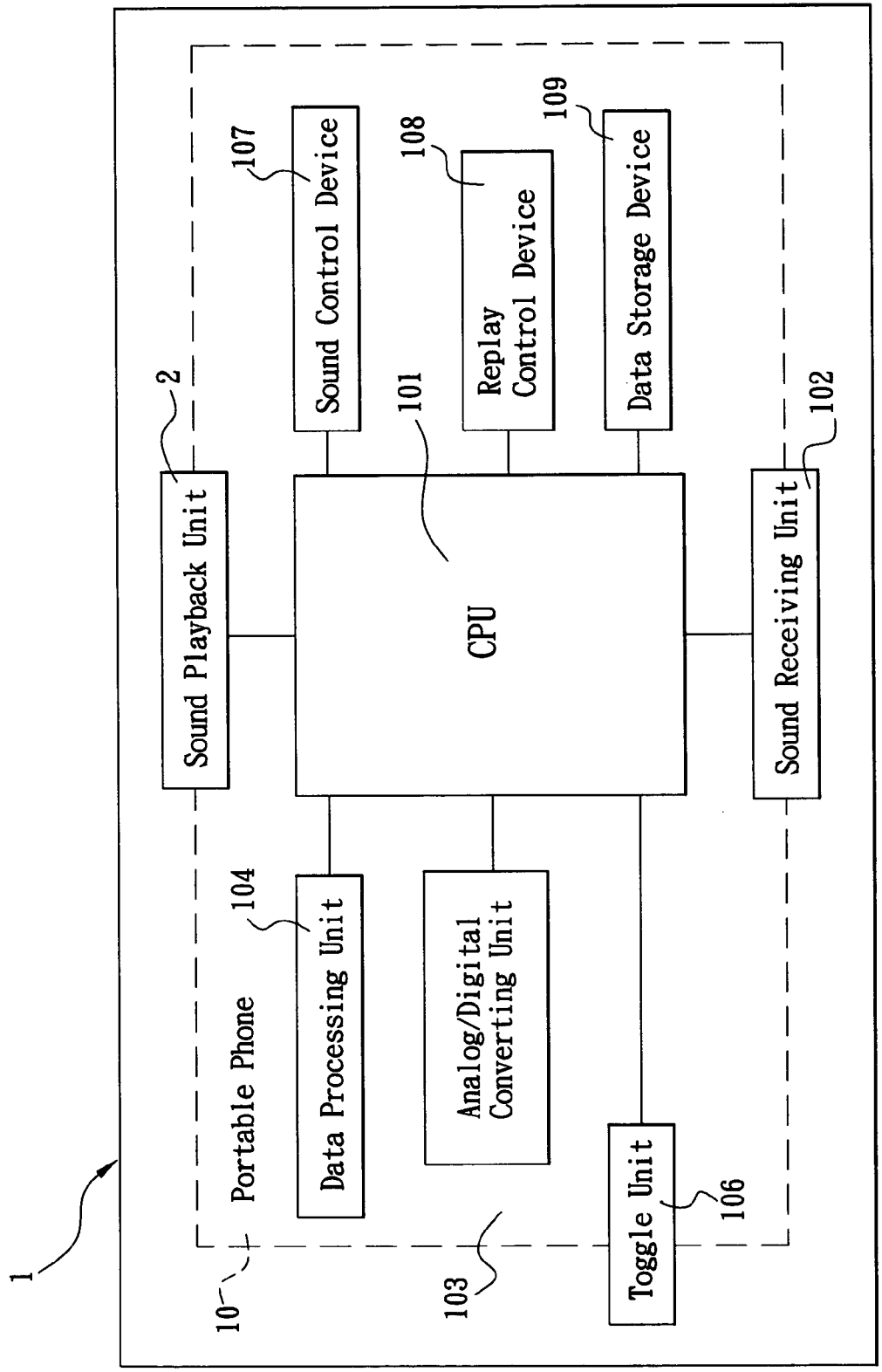
FIG. 1 is a block diagram of the structure of the present invention.

Please refer to FIG. 1 for the portable phone capable of being switched into a hearing aid function according to the present invention. The portable phone 1 comprises a circuit board 10 therein and the circuit board 10 has a central processing unit 101, a sound receiving unit 102, an analogy/digital converting unit 103, a data processing unit 104, a sound playback unit 2, and a toggle unit 106; wherein the portable phone 1 serves exactly like a general mobile phone at regular time. When the toggle unit 106 is started, the central processing unit 101 converts a primitive analog signal (such as the voice in a telephone conversation) received by the sound receiving unit 102 into a primitive digital signal by the analog/digital converting unit 103. The volume (also known as amplitude) of the original digital signal is amplified by the audio data processing unit 104 appropriately, and the noises of the original signal are filtered to produce an amplified digital signal. The amplified digital signal is converted into an amplified analog signal by the analog/digital converting unit 103 and then played by the sound playback unit 2.

A person having a hearing problem can use or operate a portable phone (such as a smart phone integrating a mobile phone and a PDA combined with the mobile phone) to save the cost of buying an additional mobile phone). Therefore, a person having a hearing problem can use the portable phone 1 to talk with others at regular time, or appropriately amplify the other's voice to assist and enhance the hearing ability. If a user wants to use the telephone function, the user turns on the toggle unit 106 to operate or use the basic functions of the portable phone 1 such as having a telephone call, sending or receiving a short message or an email, or chatting in the chat room etc. Therefore, the present invention has substantial significance on benefiting the people who have a hearing problem.

The toggle unit 106 of the present invention could be a hardware switch disposed on the casing of the portable phone and electrically connected with the circuit board, so that a user can directly flip the hardware switch to turn on or off the hearing aid function of the portable phone 1. The toggle unit 106 could also be a software switch installed in a man-machine interface of the portable phone 1, so that a user can use a screen and a plurality of press buttons on the portable phone 1 to enter an option (such as the "ON" or "OFF" in the "Hearing Aid Function") into the man-machine interface.

Figure 2:
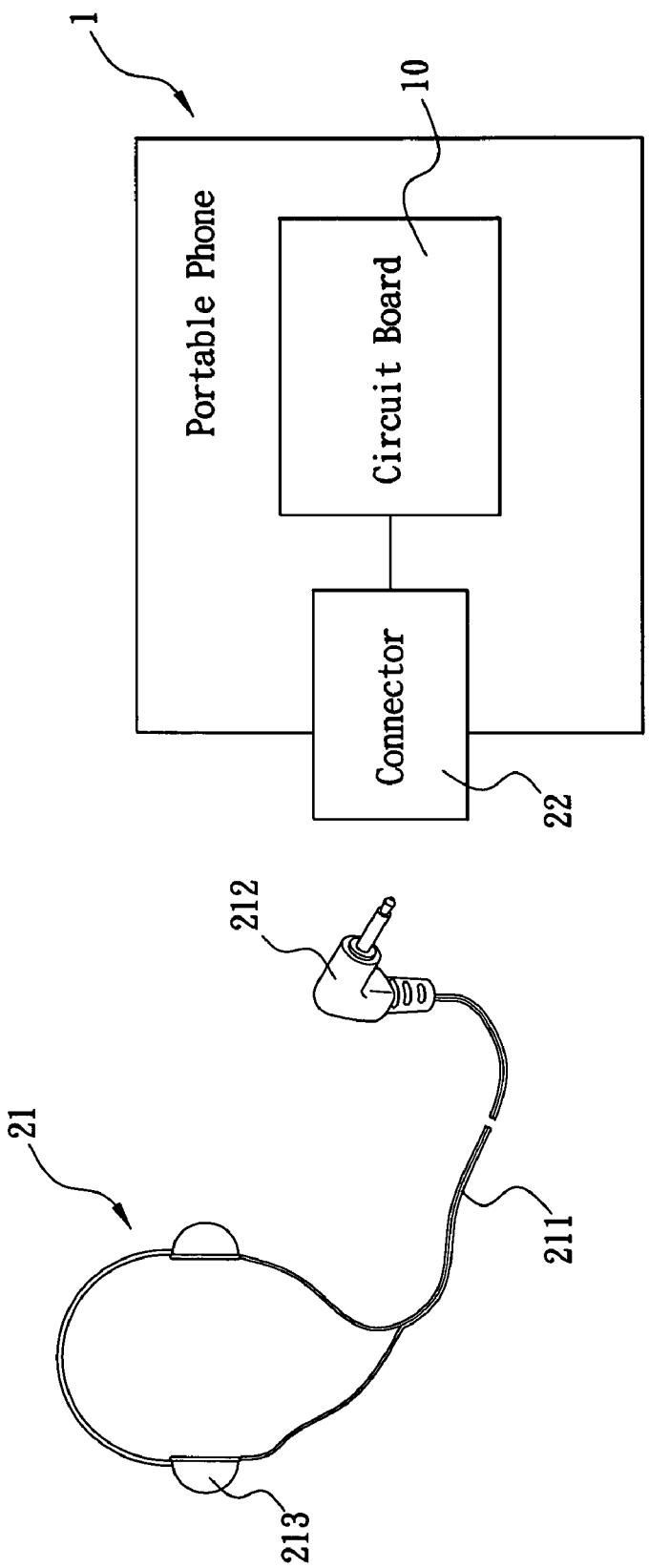
FIG. 2 is a schematic view of a first preferred embodiment of the present invention.

Please refer to FIGS. 1 and 2 for a preferred embodiment of the present invention. The sound playback unit 2 comprises a cable earphone 21 and a connector 22 (as shown in FIG. 2), wherein the connector 22 connected to the circuit board 10 has an insert hole, and the cable earphone 21 has a signal line 211, and one end of the signal line 211 is an insert terminal 212, and the other end is connected to at least one speaker 213. When the insert terminal 212 is inserted into the insert hole, the amplified analog signal passes through the connector 22, the insert terminal 212, and the signal line 211 in order, and finally played by the speaker 213.

Figure 3:
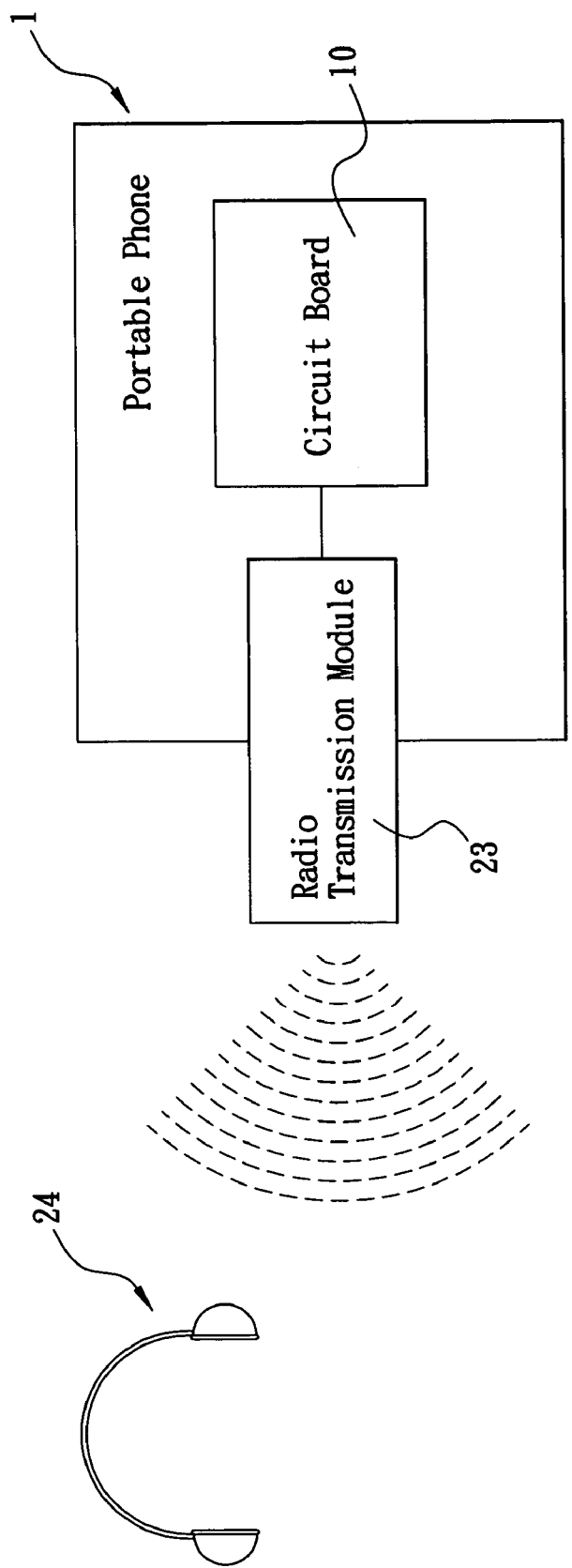
FIG. 3 is a schematic view of a second preferred embodiment of the present invention.

Please refer to FIGS. 1 to 3 for another preferred embodiment of the present invention. Since the signal line 211 is limited to a specific length and a user having a hearing problem cannot place the portable phone 1 at a position far away from the user while the user is wearing a cable earphone 21, therefore the sound playback unit 2 further comprises a radio transmission module 23 (such as an infrared module or a Bluetooth wireless module) and a wireless earphone 24 (as shown in FIG. 3); wherein the wireless earphone 24 at least has another speaker therein, and the radio transmission module 23 works together with a wireless receiver, so that after the amplified digital signal is converted back to the amplified analog signal by the analog/digital converting unit 103, the amplified analog signal is transmitted to the wireless receiver through the radio transmission module 23 and played by another speaker. Therefore, a person who has a hearing problem just needs to wear a wireless earphone and put the portable phone 1 in an appropriate direction or at a farther position for receiving the sound without being limited by the length of the signal line 211.

Please refer to FIG. 1 for another preferred embodiment of the present invention. Since some people have a hearing problem on both ears, but the hearing ability is different on both ears, therefore a channel control device 107 (such as a digital signal processor, DSP) is installed on the circuit board 10 for eliminating noises, balancing frequencies, and adjusting the volume of sound on the left and right channels, so that the person having a hearing problem can use the channel control device 107 to adjust the sound volume of the left and right channels of the cable earphone 21 or the wireless earphone 24.

In another preferred embodiment of the present invention, the circuit board has a replay control device 108 and a data storage device 109 (such as a memory module or a memory card) wherein the replay control device 108 can save the amplified digital signal into the data storage device 109. If the user wants to replay the amplified digital signal, the user can use the replay control device 108 to send the amplified digital signal to the analog/digital converting unit 103 to reverse the amplified digital signal into the amplified analog signal and play the amplified analog signal from the sound playback unit 2.

While the invention has been described by means of specific embodiments, numerous modifications and variations could be made thereto by those skilled in the art without departing from the scope and spirit of the invention set forth in the claims.

What is claimed is:

1. A portable phone capable of being switched into hearing aid function and having a circuit board disposed therein and a central processing unit disposed on said circuit board, and said central processing unit being coupled to the following components for a signal transmission:
   a screen, disposed at an appropriate position on a casing of said portable phone;
   a plurality of press buttons, disposed at an easy-to-operate position on said casing of said portable phone;
   a sound receiving unit, for receiving an analog signal transmitted from a surrounding environment within a finite range;
   an analog/digital converting unit, for converting a received audio signal selectively into an analog signal and a digital signal;
   a data processing unit, for appropriately amplifying the volume of said digital signal and filtering noises;
   a sound playback unit, for playing an analog signal with an amplified volume; and
   a toggle unit, for toggling between a hearing aid function and a telephone function.

2. The portable phone of claim 1, wherein said toggle unit is a hardware switch built on a casing of said portable phone and electrically coupled with said circuit board for a signal connection, such that said hearing aid function of said portable phone is selectively enabled and disabled by flipping said hardware switch.

3. The portable phone of claim 1, wherein said toggle unit is a software switch built in a man-machine interface of said portable phone, such that said screen and said plurality of press buttons enable users to enter into an option of said man-machine interface to selectively enable and disable said hearing aid function of said portable phone.

4. The portable phone of claim 1, wherein said sound playback unit comprises:
   a cable ear phone, having a signal line, and a connecting terminal is disposed at an end of said signal line and at least a speaker disposed at the other end of said signal line; and
   a connector, coupled with a circuit board, and having an insert hole thereon, so that said connecting terminal being inserted into said insert hole.

5. The portable phone of claim 4, wherein said circuit board comprises a channel control device for adjusting the sound volume of a left channel and a right channel of said speaker.

6. The portable phone of claim 1, wherein said sound playback unit comprises:
 a wireless ear phone, having a radio receiver and at least one other speaker thereon; and
 a radio transmission module, for sending an analog signal after its sound volume is amplified to said radio receiver, so that said other speaker plays said analog signal.

7. The portable phone of claim 6, wherein said circuit board comprises a channel control device for adjusting the sound volume of said left channel and said right channel of said other speaker.

8. The portable phone of claim 1, wherein said circuit board comprises a replay control device and a data storage device, and said replay control device is capable of saving an amplified digital signal into said data storage device.

9. The portable phone of claim 1, wherein said portable phone is a personal digital assistant having a communication function.

10. The portable phone of claim 1, wherein said portable phone is a mobile phone.

* * * * *